(12) United States Patent
Lichtfuss

(10) Patent No.: US 7,154,642 B2
(45) Date of Patent: Dec. 26, 2006

(54) DISPLAY DEVICE HAVING IMAGE ACQUISITION CAPABILITIES AND METHOD OF USE THEREOF

(75) Inventor: Hans A. Lichtfuss, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1074 days.

(21) Appl. No.: 09/748,345

(22) Filed: Dec. 22, 2000

(65) Prior Publication Data

US 2002/0080255 A1    Jun. 27, 2002

(51) Int. Cl.
H04N 1/04 (2006.01)

(52) U.S. Cl. .................. 358/497; 358/474; 358/483; 361/680

(58) Field of Classification Search ............... 358/474, 358/497, 496, 487, 506, 475, 498, 483, 540, 358/400; 361/680, 36; 250/234, 208.1; 271/10.11, 121
See application file for complete search history.

(56) References Cited

U.S. PATENT DOCUMENTS

| | | | |
|---|---|---|---|
| 4,794,384 A | 12/1988 | Jackson | |
| 4,870,268 A | 9/1989 | Vincent et al. | 250/226 |
| 4,926,041 A | 5/1990 | Boyd | 250/226 |
| 5,019,703 A | 5/1991 | Boyd et al. | 250/208.1 |
| 5,032,004 A | 7/1991 | Steinle | 350/171 |
| 5,040,872 A | 8/1991 | Steinle | 359/638 |
| 5,044,727 A | 9/1991 | Steinle | 350/171 |
| 5,159,322 A | 10/1992 | Loebner | |
| 5,227,620 A | 7/1993 | Elder, Jr. et al. | 250/201.8 |
| 5,301,034 A | 4/1994 | Jacob | |
| 5,410,347 A | 4/1995 | Steinle et al. | 348/270 |
| 5,883,727 A * | 3/1999 | Tsai | 358/475 |
| 5,907,413 A | 5/1999 | Han | 358/497 |
| 6,078,407 A * | 6/2000 | Ma | 358/474 |
| 6,084,990 A * | 7/2000 | Suzuki et al. | 382/312 |
| 6,278,101 B1 * | 8/2001 | Puyot | 250/208.1 |
| 6,453,361 B1 * | 9/2002 | Morris | 709/250 |

(Continued)

FOREIGN PATENT DOCUMENTS

CN      1124384 A      6/1996

(Continued)

OTHER PUBLICATIONS

Printout from Kodak web site (www.kodak.com), printed Nov. 22, 2000, 2 pages.

(Continued)

Primary Examiner—David Moore
Assistant Examiner—Heather D Gibbs

(57) ABSTRACT

A digital picture frame device is provided with image acquisition capabilities. The digital picture frame device may include a display device mounted on a hinged lid. An image acquisition device may be located beneath the hinged lid. The image acquisition device may, for example, be a line scanner in which successive scan line images of an object are obtained as the scan head moves in relation to the object being scanned. Alternatively, the image acquisition device may be a two dimensional image acquisition device. In this manner, an image of a desired object can be acquired and displayed on the digital picture frame device without the need for a separate image acquisition device. Alternatively, the digital picture frame device may be provided without a hinged lid. In this case, an object to be scanned may be fed into the digital picture frame device through a slot. A drive mechanism, e.g., drive rollers, may be provided to move the object through the digital picture frame device past a stationary line scanner device or to a position adjacent a two dimensional image acquisition device.

22 Claims, 5 Drawing Sheets

U.S. PATENT DOCUMENTS 6,486,980 B1 * 11/2002 Sawanobori ................ 358/487
6,567,190 B1 * 5/2003 Reele ......................... 358/474

FOREIGN PATENT DOCUMENTS

| | | |
|---|---|---|
| JP | 61-269555 A | 11/1986 |
| JP | 1-198168 A | 8/1989 |
| JP | 6-50941 | 2/1994 |
| JP | 11-308418 | 11/1999 |
| WO | WO85/00234 | 1/1985 |
| WO | WO98/03932 | 1/1998 |

OTHER PUBLICATIONS

Printout from Ceiva web site (www.ceiva.com), printed Jul. 25, 2000, 2 pages.

Printout from Digi-Frame web site (www.dig-frame.com), printed Aug. 16, 2000, 2 pages.

Australian Patent Office Search Report dated Aug. 18, 2003, 2 pages.

English Translation of German Office Action dated Aug. 16, 2005, issued in German Application No. 10157456.8-31, 2 pages.

German Office Action dated Aug. 16, 2005, issued in German Application No. 10157456.8-31, 3 pages.

English language abstract for Japanese Patent No. JP 1-198168 A, 1 page.

English language abstract for Japanese Patent No. JP 61-269555 A, 1 page.

* cited by examiner

DISPLAY DEVICE HAVING IMAGE ACQUISITION CAPABILITIES AND METHOD OF USE THEREOF

FIELD OF THE INVENTION

The present invention relates generally to display devices and, more specifically, to display devices having a digital picture frame format.

BACKGROUND OF THE INVENTION

Display devices, commonly known in the industry as "digital picture frames" are well known in the art and are used to display digital images. A digital picture frame includes a display which may, for example, be an LCD type display. The display is generally mounted within a housing having a picture frame type format. In other words, the housing may have a configuration similar to that of a conventional picture frame commonly used to hold and display photographs. The housing of a digital picture frame, in a manner similar to a conventional picture frame, generally includes a stand to allow the digital picture frame to be placed upright on a desk or table so as to facilitate display of the image appearing thereon.

A digital picture frame device typically includes an internal memory apparatus for storing one or more images to be displayed by the device. One or more user interface buttons may also be provided in order to allow a user to select which image stored in memory is to be displayed. In some devices, a user may also choose to have various images that are stored in memory sequentially displayed on the device over selected time intervals. A digital picture frame device also typically includes a power cord which allows the device to be connected to a standard home electrical power outlet in order to supply power to the device.

Images may be transferred to digital picture frame devices in various manners. In one type of digital picture frame device, a connection may be made to a conventional telephone line. Digital image files may then be downloaded to the device via the internet. Accordingly, to download images to this type of digital picture frame, the images must first be uploaded to an internet site. An example of such a digital picture frame device which downloads digital image files from the internet is commercially available from Ceiva Logic, Inc., 9120 Sunset Boulevard, Suite 200, West Hollywood, Calif. 90069.

In another type of digital picture frame device, images may be transferred to the device via memory cards, such as those useable in conjunction with many digital cameras, or from a personal computer via a cable. Accordingly, to download images to this type of digital picture frame device, the images must first be uploaded to a personal computer or acquired by a digital camera device. An example of such a digital picture frame device which downloads digital image files from a memory card or from a personal computer is commercially available from Digi-Frame Inc., 181 Westchester Ave., Port Chester, N.Y. 10573.

In yet another type of digital picture frame device, images may be transferred to the device via memory cards, such as those useable in conjunction with many digital cameras, or to and from the device via a conventional telephone line. An example of such a digital picture frame device is commercially available from Eastman Kodak Company.

As can be appreciated from the above, conventional digital picture frame devices are only capable of displaying images which have already been digitized by a separate device (e.g., a digital camera or a scanner). Accordingly, if it is desired to display an image of an object, e.g., a photograph, on a conventional digital picture frame device, the object must first be scanned (e.g., with a flatbed scanning device) or imaged (e.g., with a digital camera) in a separate image acquisition device. A digital file representative of the acquired image must then be transferred to the digital picture frame device (e.g., via the internet and a telephone line or via a memory card or cable).

Accordingly, it would be desirable to provide a digital picture frame device which overcomes this problem in that it is capable of displaying an image of an object without the need for a separate image acquisition device.

SUMMARY OF THE INVENTION

A digital picture frame device having image acquisition capabilities is disclosed. The digital picture frame device may include a display device mounted on a hinged lid. An image acquisition device may be located beneath the hinged lid. The image acquisition device may, for example, be a line scanner in which successive scan line images of an object are obtained as the scan head moves in relation to the object being scanned. Alternatively, the image acquisition device may be a two dimensional image acquisition device. In this manner, an image of a desired object can be acquired and displayed on the digital picture frame device without the need for a separate image acquisition device.

The digital picture frame device may include a data connection to enable data image files to be transferred to and from the device. The data connection may, for example, take the form of a modem and telephone line or a computer cable. The data connection may, alternatively, be configured as a non-physical connection such as a radio frequency or infrared communications device. The digital picture frame device may also include a device for writing to and reading from memory cards, such as those useable in conjunction with many digital cameras. The digital picture frame device may include appropriate user controls so that, once an image is acquired, a user may choose, for example, to discard the image, save it in memory, display it and/or transfer it to another location.

In an alternative embodiment, the digital picture frame device may be provided without a hinged lid. In this case, an object to be imaged may be fed into the digital picture frame device through a slot. A drive mechanism, e.g., drive rollers, may be provided to move the object through the digital picture frame device past a stationary line scanner device. Alternatively, the digital picture frame device may be provided with a two dimensional image acquisition device in which case the drive mechanism may be used to position the object adjacent the image acquisition device.

DESCRIPTION OF THE INVENTION

Figure 1:
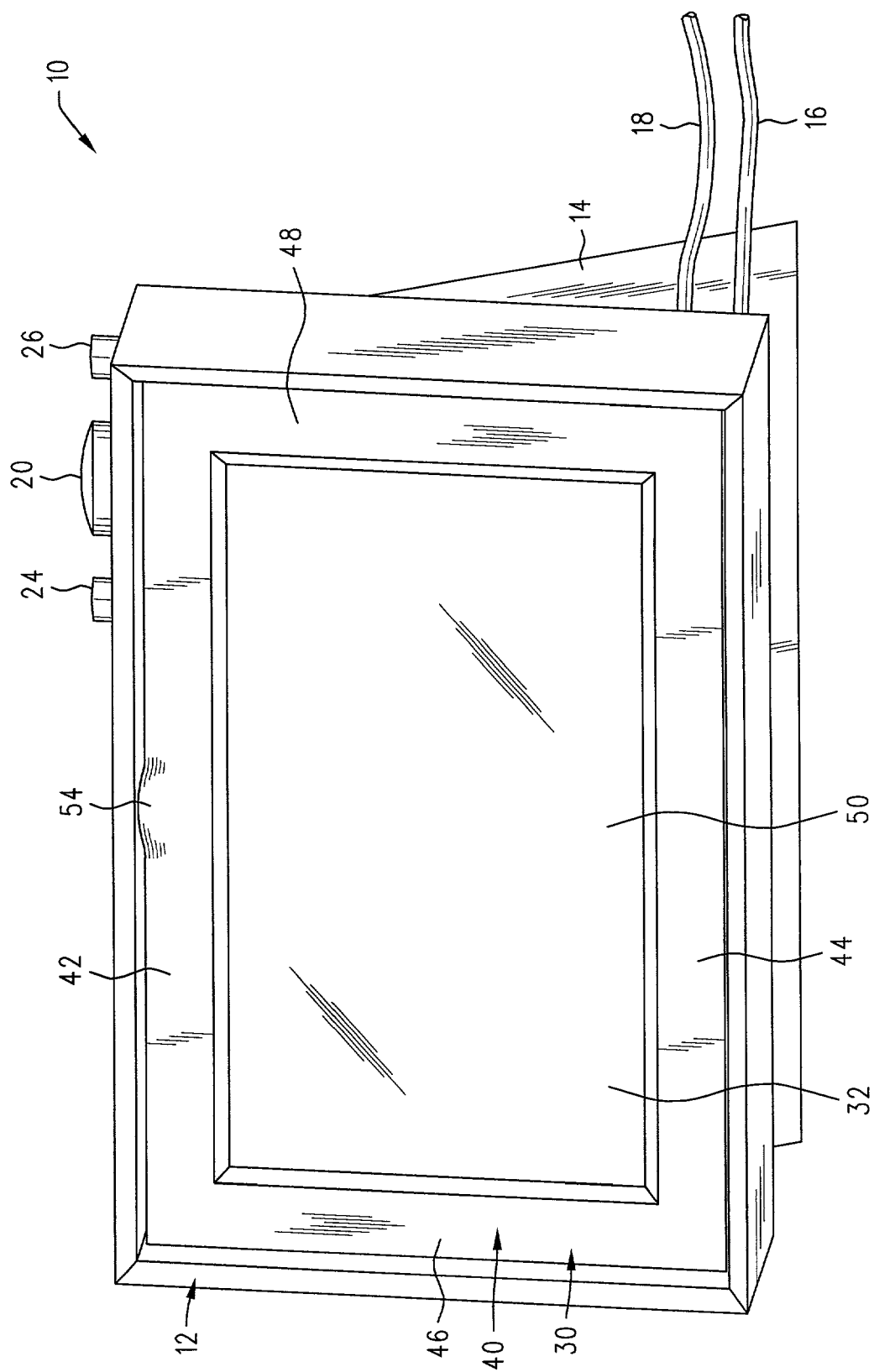
FIG. 1 is a perspective view of a digital picture frame device having an openable lid.

FIGS. 1–5, in general, illustrate a device 10 having a display 32 and a photosensor array 64. The photosensor array 64 may be movable relative to the display 32.

FIGS. 1–5 further illustrate, in general, a device 10 having a display 32, a photosensor array 64 and a lid 30 which may be hingedly attached to the remainder of the device 10. The display 32 may be mounted on the lid 30.

FIGS. 1–5 further illustrate, in general a device 10, 310 having a display 32, 332; a photosensor array 64, 364 and a central processing unit 70 operatively connected to both the display 32, 332 and the photosensor array 64, 364. The device 10, 310 may be a digital picture frame device.

FIGS. 1–5 further illustrate, in general a method including providing a device 10, 310 having a display 32, 332 and a photo-electric imaging apparatus 64, 364. The method may further include using the photo-electric imaging apparatus 64, 364 to generate a data set representative of an image of an object by causing relative movement between the object and at least a portion of the photoelectric imaging apparatus 64, 364 while the device 10, 310 remains stationary.

Having thus described the apparatus and method in general, they will now be described in further detail.

Figure 2:
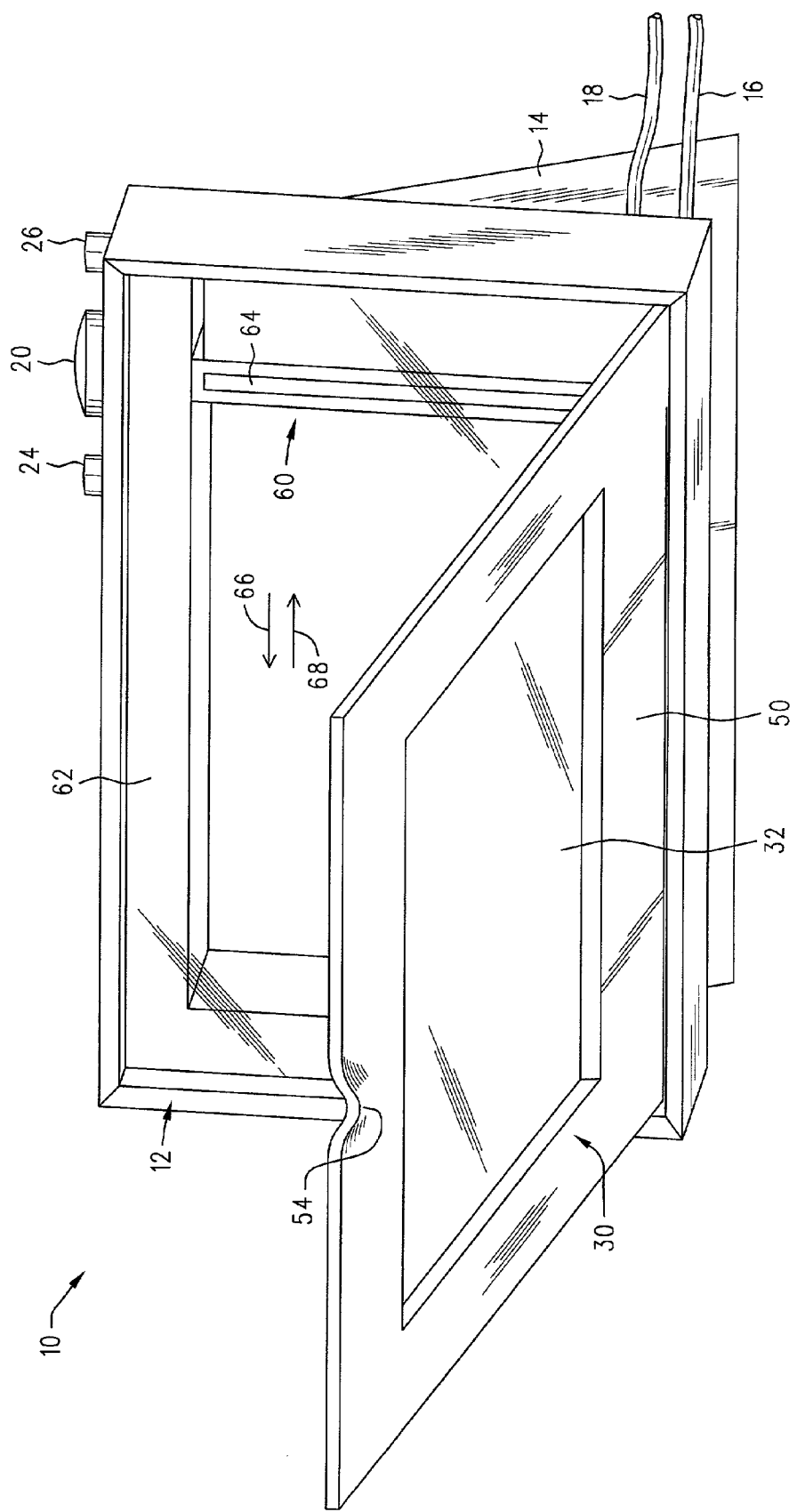
FIG. 2 is a perspective view of the digital picture frame device of FIG. 1 with the lid in the open position.

FIGS. 1 and 2 illustrate a digital picture frame device 10. Digital picture frame device 10 may include an outer frame 12. A lid 30 may, for example, be hingedly attached to the outer frame 12 such that the lid 30 is moveable from a closed position, as illustrated in FIG. 1, and an open position, as illustrated in FIG. 2. A display device 32 may be housed on the lid 30 such that the display device is readily visible from the exterior of the digital picture frame device 10 when the lid 30 is in the closed position. Display device 32 may, for example be a conventional LCD type display. A switch 56, FIG. 3, may be provided in order to sense when the lid 30 is in its open position (FIG. 2) and when the lid 30 is in its closed position (FIG. 1).

An opaque border 40 may surround the display device 32 as shown and may include an upper border portion 42, a lower border portion 44, a left border portion 46 and a right border portion 48. A transparent cover glass 50 may be mounted to the lid 30 and may cover the border 40 and the display device 32. A raised portion 54 may be formed in the lid 30 as shown. Raised portion 54 may, for example, be configured so as to be engageable by a human user's finger or thumb and, thus facilitate movement of the lid 30 from its closed position to its open position.

A support member 14 may be hingedly attached to the rear surface, not shown, of the digital picture frame device 10. Support member 14 may be provided in order to allow the digital picture frame device to be positioned in an upright manner on a support surface, e.g., a table, in a conventional manner. Support member 14 may be hingedly attached to back of the frame such that it can be folded relatively flat against the back of the frame. In this manner, the digital picture frame device 10 may be hung on a wall as an alternative to being positioned on a support surface as described above.

Digital picture frame device 10 may include a power cord 16. Power cord 16 may, for example, be a conventional power cord designed to supply electrical power to the digital picture frame device 10, e.g., from a wall outlet. Alternatively, digital picture frame device 10 may be provided with an internal battery, not shown, for supplying power to the device. In the case where an internal battery is provided, the power cord 16 may be omitted.

Digital picture frame device 10 may further include a data link 18. Data link 18 may, for example, be a telephone line or a cable linking the digital picture frame device 10, e.g., to a personal computer. User interface buttons 20, 24 and 26 may, for example, be located on the upper surface of the frame 12, as illustrated.

FIG. 2 illustrates the digital picture frame device 10 with the lid 30 in its open position. As can be seen from FIG. 2, an image acquisition device 60 may be located beneath the lid 30. A platen 62 may overlie the image acquisition device 60 as shown. Platen 62 may, for example, be formed from a sheet of clear glass or other clear material.

Image acquisition device 60 may include a scan head 64 which is movable beneath the platen 62 in the directions indicated by the arrows 66, 68. Image acquisition device 60 may be a conventional optical scanner as is well known in the art for producing machine-readable data which is representative of the image of an object, e.g. a photograph or a page of printed text. More specifically, image acquisition device 60 may be a line-focus system which images an object by sequentially focusing narrow "scan line" portions of the object onto a linear photosensor array by sweeping the scan head 64 past the object to be scanned. In this manner, an object, e.g., a photograph, may be laid face down on the platen 62. Thereafter, the scan head 64 may be swept past the object, in the direction 66 in order to sequentially obtain the scan line portions of the object.

Image acquisition device 60 may, for example, be a scanning device of the type using a conventional charge coupled device (CCD) type linear photosensor array. In this type of scanning device, an optical system is included within the scan head for the purpose of focusing successive line images of the object onto the CCD. The optical system typically includes a lens and a plurality of mirrors for folding the light path. Examples of scanning devices using CCD type arrays are disclosed in the following U.S. Pat. No. 5,410,347 of Steinle et al. for COLOR OPTICAL SCANNER WITH IMAGE REGISTRATION HOLDING ASSEMBLY; U.S. Pat. No. 4,870,268 of Vincent et al. for COLOR COMBINER AND SEPARATOR AND IMPLEMENTATIONS; U.S. Pat. No. 4,926,041 of Boyd for OPTICAL SCANNER; U.S. Pat. No. 5,019,703 of Boyd et al. for OPTICAL SCANNER WITH MIRROR MOUNTED OCCLUDING APERTURE OR FILTER; U.S. Pat. No. 5,032,004 of Steinle for BEAM SPLITTER APPARATUS WITH ADJUSTABLE IMAGE FOCUS AND REGISTRATION; U.S. Pat. No. 5,044,727 of Steinle for BEAM SPLITTER/COMBINER APPARATUS; U.S. Pat. No. 5,040,872 of Steinle for BEAM SPLITTER/COMBINER WITH PATH LENGTH COMPENSATOR; and U.S. Pat. No. 5,227,620 of Elder, Jr. et al. for APPARATUS FOR ASSEMBLING COMPONENTS OF COLOR OPTICAL SCANNERS, which are all hereby specifically incorporated by reference for all that is disclosed therein.

Although a CCD type scanning system (as described above) may be used, in order to reduce the size of the digital picture frame device 10 (and, thus, facilitate maintaining the conventional picture frame format), it is preferred that the image acquisition device 60 be a scanning device of the type using a contact image sensor (CIS) photosensor array. In contrast to the CCD type scanning system described above, a contact image sensor scanning device does not require a complex optical system. Accordingly, the use of a contact image sensor scanning device as the image acquisition device 60 allows the overall size of the digital picture frame device 10 to be minimized. Image acquisition device 60 may, for example, be a CIS type scanning device of the type generally described in U.S. Pat. No. 5,907,413 of Han for CONTACT IMAGE SENSOR FLAT BED SCANNER, which is hereby specifically incorporated by reference for all that is disclosed therein.

Figure 3:
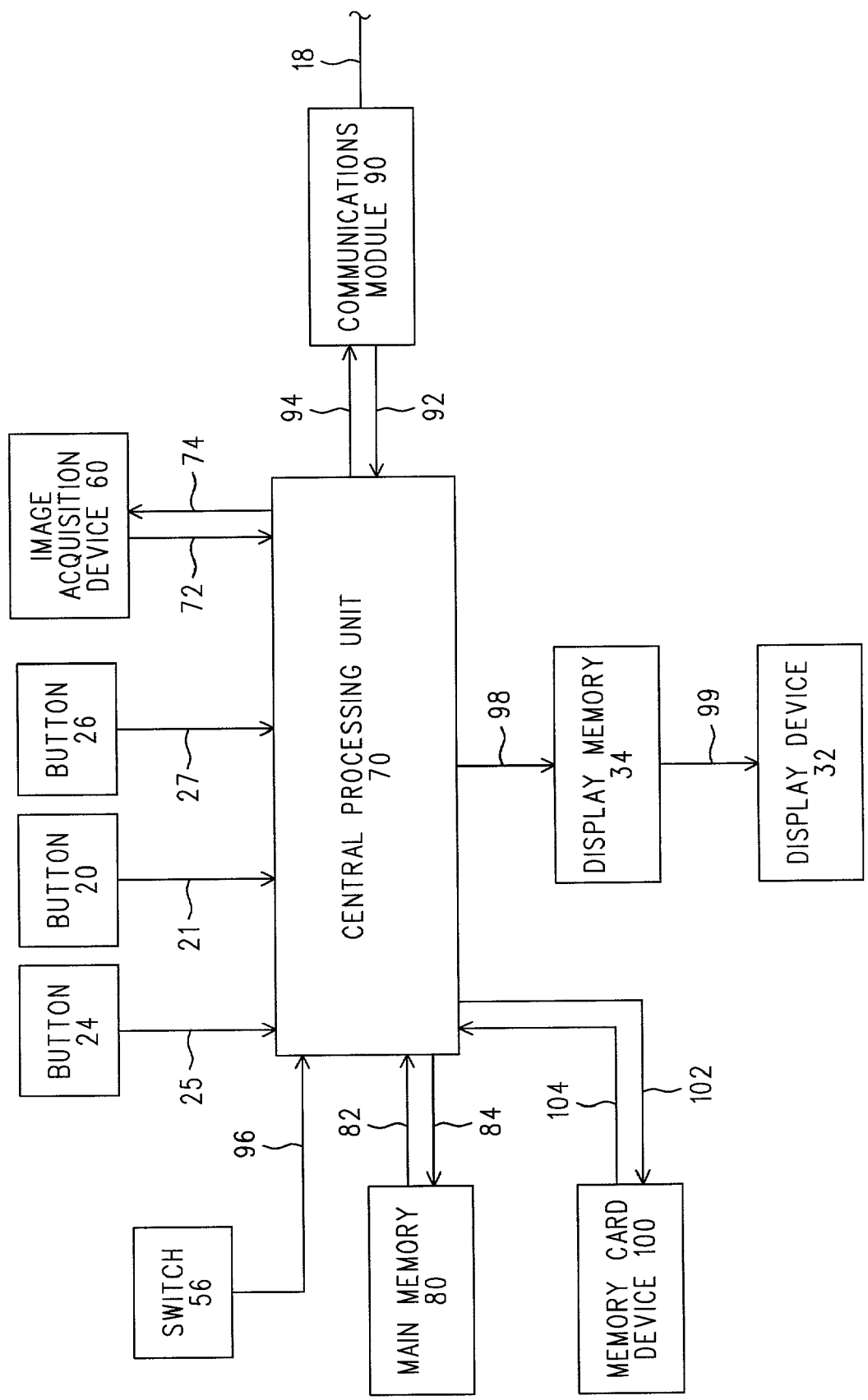
FIG. 3 is a schematic drawing illustrating the operation of the digital picture frame device of FIGS. 1 and 2.

FIG. 3 is a schematic drawing illustrating the operational components of the digital picture frame device 10. Referring now to FIG. 3, a central processing unit 70 may be provided as shown. An input connection path 72 may extend from the image acquisition device 60 to the central processing unit 70 and an output connection path 74 may extend from the central processing unit 70 to the image acquisition device 60. A main memory 80 may be provided as shown. An input connection path 82 may flow from the main memory 80 to the central processing unit 70 and an output connection path 84 may flow from the central processing unit 70 to the main memory 80.

With further reference to FIG. 3, a communications module 90 may be provided, as shown. An input connection path 92 may extend from the communications module 90 into the central processing unit 70. An output connection path 94 may extend into the communications module 90 from the central processing unit 70. The data link 18 may be connected to the communications module 90, as shown. A display memory 34 may be provided, as shown. Display memory 34 may be a memory device used to buffer data used to display an image on the display device 32 in a conventional manner. An output connection path 98 may extend from the central processing unit 70 to the display memory 34 and an output connection path 99 may extend from the display memory 34 to the display device 32. An input connection path 96 may extend into the central processing unit from the switch 56.

As previously described, conventional digital picture frame devices are only capable of displaying images which have already been digitized by a separate device (e.g., a digital camera or a scanner). Accordingly, if it is desired to display an image of an object, e.g., a photograph, on a conventional digital picture frame device, the object must first be scanned (e.g., with a flatbed scanner) or imaged (e.g., with a digital camera) in a separate image acquisition device. A digital file representative of the acquired image must then be transferred to the digital picture frame device (e.g., via the internet and a telephone line or via a memory card or cable).

The digital picture frame device 10 described herein, however, overcomes this problem by providing an image acquisition device integrally formed in the digital picture frame device. Accordingly, using the digital picture frame device 10 described herein, if a user desires to display an image of an object, such as a photograph, the photograph can be scanned with the image acquisition device 60 and then immediately displayed on the display device 32 of the digital picture frame device 10 without the need for a separate image acquisition device.

An exemplary process of scanning and displaying an object, such as a photograph, with the digital picture frame device 10 will now be described in detail. First, a user may use the raised portion 54 to move the lid 30 from the closed position, as shown in FIG. 1, to the open position, as shown in FIG. 2. An object, e.g., a photograph, may then be placed, face down, on the glass platen 62. The user may then return the lid 30 to its closed position. With reference to FIG. 3, the switch 56 detects that the lid 30 has been re-closed and sends a signal indicative thereof to the central processing unit 70 via connection path 96. In response to the signal from the switch 56, the central processing unit 70 sends a signal along the connection path 74 to the image acquisition device 60, causing the image acquisition device to initiate a scan of the object that has been placed on the platen 62.

It is noted that, although the above has been described with respect to the scan being initiated by closing the lid 30 (via the switch 56), the scan could, alternatively be initiated directly by the user, e.g., with the button 20, FIG. 1.

When the scan is initiated, the scan head 64 may begin moving in the direction 66, FIG. 2, and acquiring data corresponding to line images of the object being scanned in a conventional manner. This data is transmitted to the central processing unit 70 via the data input path 72, FIG. 3. After the entire object has been scanned, the scan head 64 may move in the direction 68, FIG. 2, to return to its initial position and the central processing unit 70 may assemble all of the line image data into a data set representative of an image of the entire object and may be stored in the main memory 80. This complete data set may then be transmitted to the display memory 34, via the output connection path 98, and then to the display device 32, via the output connection path 99, thus causing the display device 32 to display the scanned image of the object.

Alternatively, the scan head 64 may initially perform a pre-scan by moving in the direction 66. Such a pre-scan is a conventional mechanism for obtaining basic information about the object being scanned. After the pre-scan is completed, the scan head 64 may then perform full scan by moving in the direction 68 or by returning to the starting position and then performing the full scan in the direction 66.

After the scan has been completed, the central processing unit 70, in addition to transmitting the scanned image data set to the display device 32, may also send data to the display device 32 (via the display memory 34) causing the display device 32 to display a menu of options for the user. At this point, the user can view the displayed image and make a decision about what to do with it by selecting one of the menu options. The menu options may, for example, include an option to discard the image if, for example, the user is not satisfied with the way the image appears on the display. The menu options may also include an option to retain the image in the main memory 80.

After the image is stored in the main memory, it may then be displayed on the display device 32, along with images stored in the main memory 80 in a manner conventional with respect to digital picture frame devices.

The menu options may further include the option of uploading the scanned image to another location via the data link 18. As previously described, the data link 18 may, for example, be a telephone line. In this case, the communications module 90 may take the form of a conventional modem and the data corresponding to the scanned image may be sent, via the output connection path 94 to the modem (communications module 90) and then to an internet site, for example, via the telephone line (data link 18). The scanned image data may then be made accessible to others via the internet site.

As also previously described, the data link 18 may, alternatively, be a cable linking to a personal computer. In this case, the communications module 90 may take the form of a conventional connection port for coupling with a computer cable and the data corresponding to the scanned image may be sent, via the output connection path 94, to the connection port (communications module 90) and then to a personal computer via the computer cable (data link 18). In this manner, the scanned image may be viewed or manipulated on the personal computer and/or redirected to another location, e.g., a printer or the internet.

It is noted that, although the data link 18 has been described as being either a telephone line or a personal computer cable, the data link 18 could, alternatively take the form of a non-physical data link, such as a conventional radio frequency or infrared link. Such a non-physical data link could be used to establish communication between the digital picture frame device 10 and, for example, a personal computer, or any other desired device in a conventional manner. In the case where the data link 18 is a radio frequency link, for example, the communications module 90 may take the form of a conventional radio frequency interface mechanism. In the case where the data link 18 is an infrared link, for example, the communications module 90 may take the form of a conventional infrared interface mechanism.

It is noted that the communications module 90 may include multiple types of links. The communications module 90 may, for example, include both a radio frequency interface mechanism and a telephone modem. In this manner, the radio frequency interface mechanism could be used, for example, to obtain image data from a local source (e.g., a digital camera or a handheld scanner equipped with a radio frequency interface mechanism) while the modem could be used, for example, to obtain image data from a remote source via a telephone line (e.g., the internet).

As a further alternative, the data link 18 may be omitted entirely, and the digital picture frame device 10 may function as a stand-alone unit since the device has the ability to acquire its own images via the image acquisition device 60.

Digital picture frame device 10 may also include a memory card device 100, FIG. 3, for writing to and reading from memory cards, such as those useable in conjunction with many digital cameras, in a conventional manner. Specifically, memory card device 100 may be connected to the central processing unit via an input connection path 104 and an output connection path 102. In the case where the digital picture frame device 10 is provided with a memory card device, the menu options discussed above may further include the option of transferring the scanned image to a card housed within the device 100 via the output connection path 104. In this manner, the card can be removed from the digital picture frame device 10 and moved to another device in order to transfer the image to that device.

The menu options may further include options for manipulating the image acquired by the digital picture frame device. Specifically, options may be provided for adjusting the contrast or backlight intensity of an image or for rotating, cropping, sharpening or adjusting color in a conventional manner.

To select a menu item, the user interface buttons 24 and 26 may, for example, first be used to highlight the desired menu item. Specifically, depressing the user interface button 24 may cause the appropriate signal to be sent to the central processing unit 70 via the input connection path 25, FIG. 3. Depressing the user interface button 26 may cause the appropriate signal to be sent to the central processing unit 70 via the input connection path 27. Pressing the buttons 24 and 26 may cause the selected menu item to cycle in opposite directions in a conventional manner. Accordingly, the buttons 24 and 26 can be used to move a cursor or other highlighting indicator to the desired menu item. After the desired menu item is highlighted, the button 20 may be pressed to select the menu item and send the appropriate instruction to the central processing unit 70. Specifically, pressing the button 20 may cause the appropriate signal to be sent to the central processing unit 70 via the input connection path 21.

Alternatively, the buttons 24 and 26 may be omitted and the button 20, alone, used to select a menu item. Specifically, in this case, depressing the user interface button 20 may cause the appropriate signal to be sent to the central processing unit 70 via the input connection path 21, FIG. 3. The user interface button 20 may, for example, be pressed once each time it is desired to advance the highlight to the next menu item. When the desired menu item has been highlighted, the user interface button may, for example, be tapped twice in quick succession, to select the desired menu item and send the appropriate instruction to the central processing unit 70.

It is noted that the specific description of operation provided above for acquiring an image of an object with the digital picture frame device 10 is provided for exemplary purposes only. As will readily be appreciated by those skilled in the relevant arts, the operation, and the illustration of FIG. 3, could, alternatively, be accomplished in various alternative ways.

As can be appreciated from the above, a user of the digital picture frame device 10 is able to scan an object and display an image of the object on the digital picture frame device without the need for a separate image acquisition device, e.g., a separate scanner. A user of the digital picture frame device is also able to scan an object and then transmit this image to a remote location without the need for a separate image acquisition device.

It is noted that, aside from the provision of the image acquisition device 60, the digital picture frame device 10 may be operated in substantially the same manner as a conventional digital picture frame device. Specifically, for example, images may be downloaded to the digital picture frame device 10 via the input connection path 92 of the data link 18. In the case where the data link 18 is a telephone line, such images may, for example, be downloaded from an internet site. In the case where the data link 18 is a cable connecting the digital picture frame device 10 to a personal computer, the images may, for example, be downloaded to the digital picture frame device from the personal computer. Further, in the case where the digital picture frame device includes a memory card device 100 for reading from and writing to memory cards, as previously described, digital image may be transferred to the digital picture frame device 10 from such memory cards via the input connection path 104, FIG. 3, in a conventional manner.

It is further noted that, although the image acquisition device 60 has been described herein as a scanning device (and, preferably, a CIS type scanning device), the image acquisition device 60 could, alternatively, be configured as a two-dimensional array non-scanning type of image acquisition device, such as the type conventionally used in many digital cameras. Although such two-dimensional array image acquisition devices tend to be relatively large, their use may be advantageous in some situations.

Figure 4:
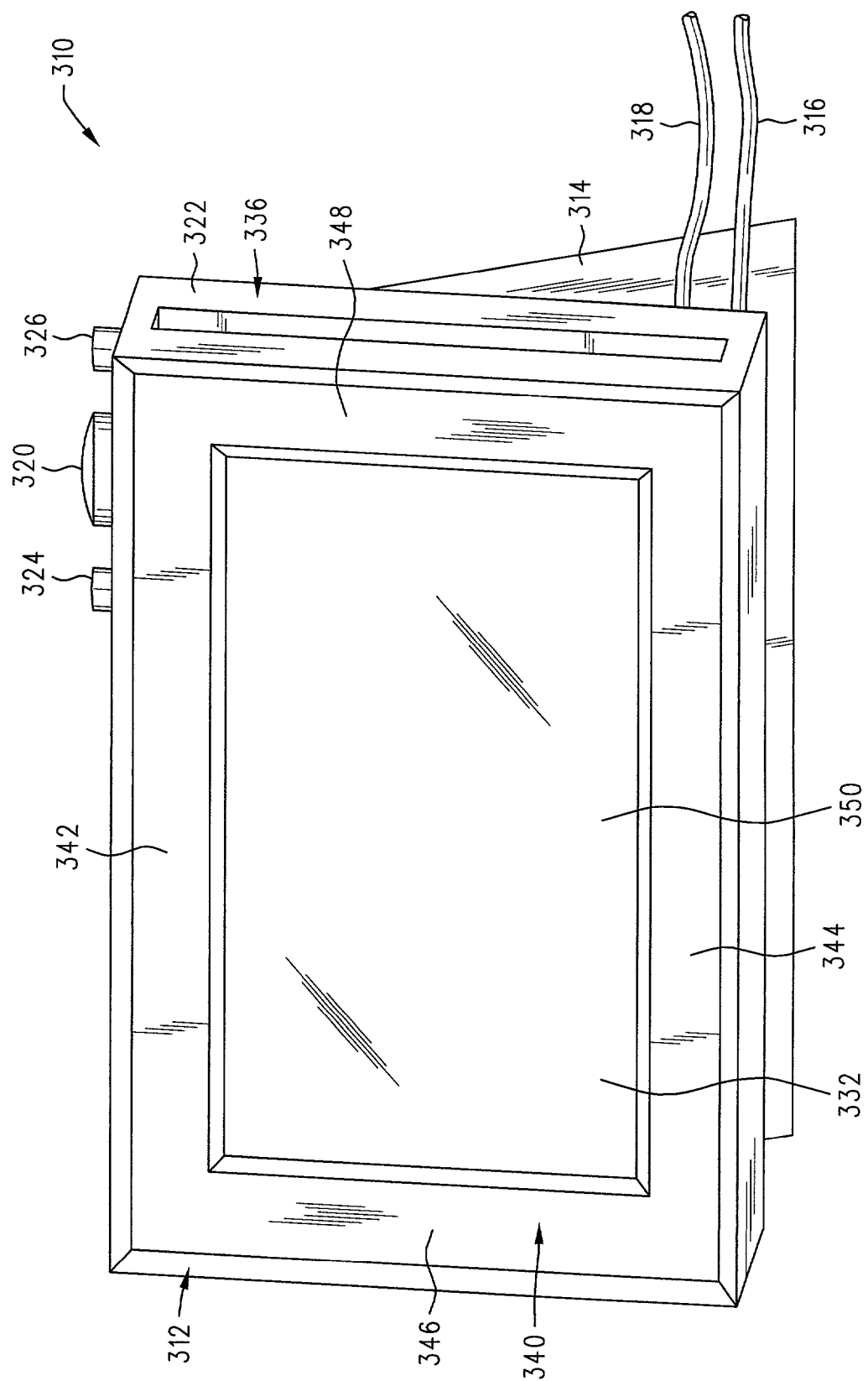
FIG. 4 is a perspective view of an alternative embodiment of a digital picture frame device.
Figure 5:
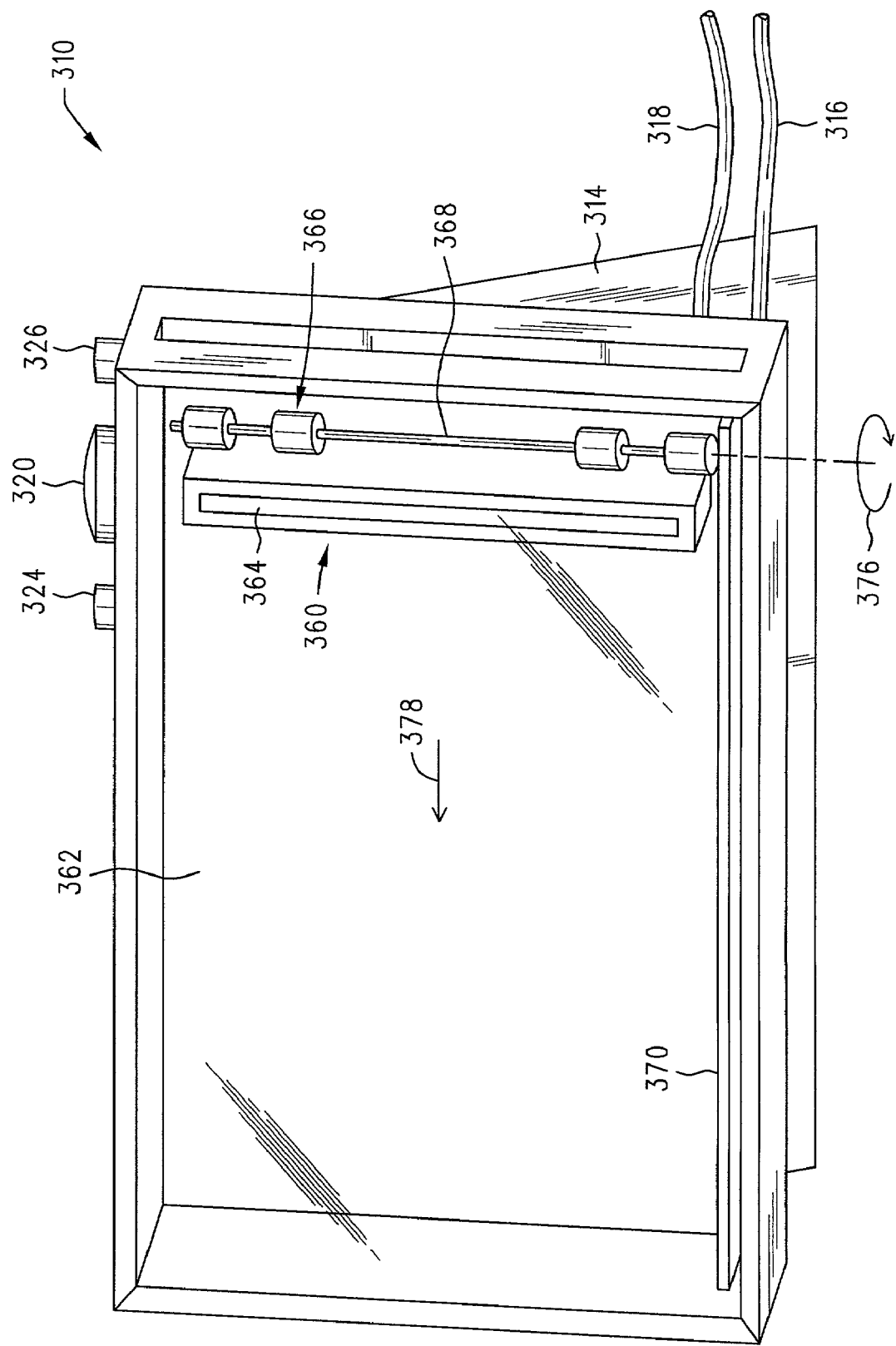
FIG. 5 is a perspective view of the digital picture frame device of FIG. 4 with a portion of the device removed for illustrative clarity.

FIGS. 4 and 5 illustrate an alternative embodiment of the digital picture frame device. The alternative embodiment is similar to the previously described version except that, in the alternative embodiment, the lid is not openable; instead, an object to be scanned may be fed through the device while the scanning device remains stationary.

Referring now to FIG. 4, a digital picture frame device 300 may include an outer frame 312. A display device 332 may be located on digital picture frame device 310 such that the display device 332 is readily visible from the exterior of the digital picture frame device. Display device 332 may, for example, be substantially the same as the display device 32 previously described with respect to the digital picture frame device 10 as illustrated in FIGS. 1 and 2. With further reference to FIG. 4, an opaque border 340 may surround the display device 332 as shown and may include an upper border portion 342, a lower border portion 344, a left border portion 346 and a right border portion 348. A transparent cover glass 350 may cover the border 340 and the display device 332.

A support member 314 may be hingedly attached to the rear surface, not shown, of the digital picture frame device 310. Support member 314 may be provided in order to allow the digital picture frame device to be positioned in an upright manner on a support surface, e.g., a table, in a conventional manner. Support member 314 may be hingedly attached to back of the frame such that it can be folded relatively flat against the back of the frame. In this manner, the digital picture frame device 310 may be hung on a wall as an alternative to being positioned on a support surface as described above.

Digital picture frame device 310 may include a power cord 316. Power cord 316 may, for example, be a conventional power cord designed to supply electrical power to the digital picture frame device 310, e.g., from a wall outlet. Alternatively, digital picture frame device 310 may be provided with an internal battery, not shown, for supplying power to the device. In the case where an internal battery is provided, the power cord 316 may be omitted.

Digital picture frame device 310 may further include a data link 318 in a similar manner to the data link 18 previously described with respect to the digital picture frame device 10. Data link 318 may, for example, be a telephone line or a cable linking the digital picture frame device 310, e.g., to a personal computer or the like. Data link 18 may alternatively take the form of an infrared or radio frequency link as previously described. User interface buttons 320, 324 and 326 may, for example, be located on the upper surface of the frame 312, as illustrated.

Referring again to FIG. 4, an entry slot 336 may be provided in a side surface 322 of the frame 312 of the digital picture frame device 310, as shown. A similarly configured exit slot, now shown, may be provided on the side surface of the frame 312 located opposite the side surface 322. The entry and exit slots may be provided in order to facilitate acquiring an image of an object within the digital picture frame device 310 in a manner as will be described in further detail herein.

FIG. 5 illustrates the digital picture frame device 310 with the display 332 and border 340 removed for illustration purposes. As can be seen from FIG. 5, an image acquisition device 360 may be provided as shown. Image acquisition device 360 may include a conventional, optical scanning head 364 as is well known in the art for producing machine-readable data which is representative of the image of an object, e.g. a photograph or a page of printed text. More specifically, image acquisition device 360 may be a line-focus system which images an object by sequentially focusing narrow "scan line" portions of the object onto a linear photosensor array. Rather than sweeping the scan head 364 past the object to be scanned (as in the image acquisition device 10), however, the scan head 364 remains stationary and the object to be imaged is moved past scan head 364.

With further reference to FIG. 5, the digital picture frame device 310 may also include a platen 362 overlying the image acquisition device 360 as shown. Platen 362 may, for example, be formed from a sheet of clear glass or other clear material. A guide 370 may be provided along the bottom edge of the platen 362 as shown. The platen 362 and guide 370 serve to support and guide an object being scanned as it moves through the digital picture frame device 310 in a manner as will be described in further detail herein.

Referring again to FIG. 5, to move an object, e.g., a photograph, past the scan head 364, a set of rollers 366 may be provided. The rollers 366 may be rotatably driven by a drive shaft 368 upon which they are mounted. The drive shaft 368, in turn, may be driven by a motor, not shown, in a conventional manner, thus causing the rollers to rotate in the direction indicated by the arrow 376. The rollers 366 may be formed from a pliable substance such a rubber or any other substance commonly used in the manufacture of drive wheels for moving paper or the like through a machine such as a conventional photocopy or telefacsimile machine.

In this manner, an object, e.g., a photograph, may be fed through the entry slot 336, FIG. 4, and thereafter engaged by the rollers 366, FIG. 5. The rollers 366 may then be rotated in the direction of the arrow 376, thus causing the object to advance past the stationary image acquisition device 360 in the direction indicated by the arrow 378 in order to sequentially image the scan line portions of the object. As the object is moved through the digital picture frame device 310 it is supported by both the platen 362 and the guide 370. After the scan is completed, and the object has moved completely through the rollers 366, the object will partially exit the frame 312 through the exit slot, thus allowing a user to remove the object from the frame.

Image acquisition device 360 may be substantially identical to the image acquisition device 60 previously described except that the image acquisition device 360 remains stationary as described above. Image acquisition device 360 may, for example, be a scanning device of the type using a conventional charge coupled device (CCD) type linear photosensor array as previously described. It is preferred, however, that image acquisition device 360 be provided as a contact image sensor (CIS) photosensor array in order to reduce the size of the digital picture frame device 310 (and, thus, facilitate maintaining the conventional picture frame format). Image acquisition device 360 may, for example, be a CIS type scanning device of the type generally described in U.S. Pat. No. 5,907,413 of Han for CONTACT IMAGE SENSOR FLAT BED SCANNER, as previously referenced. The image acquisition device 360 described herein, however, differs from that disclosed in U.S. Pat. No. 5,907,413 in the way that relative movement between the object being scanned and the scan head is accomplished. Specifically, in the scanning device of U.S. Pat. No. 5,907,413, relative movement between the object being scanned and the scan head is accomplished by moving the scan head relative to the object and the remainder of the overall device. In the digital picture frame device 310 described herein, however, relative movement between the object being scanned and the scan head 364 is accomplished by moving the object being scanned relative to the scan head and the remainder of the digital picture frame device 310.

Digital picture frame device 310 may operate in substantially the same manner as previously described with respect to the digital picture frame device 10 as generally illustrated and described with respect to FIG. 3. It is noted that digital picture frame device 310 may include a conventional sensor, not shown, to sense when an object has been inserted into the slot 336, FIG. 4. In this manner, the sensor may provide substantially the same function as the switch 56 previously described with respect to FIG. 3. Specifically, when an object is inserted into the slot 336, the sensor may send a signal causing the scanning operation to initiate. Alternatively, the scanning operation may be initiated with a button, e.g., the button 320, FIG. 4.

As an object is being scanned by the image acquisition device 360, an image of the object being scanned may be progressively displayed on the display device 332. In other words, an image may be displayed on the display device 332 that mimics the progress of the object as it advances past the image acquisition device 360. Specifically, the displayed image may move across the display device 332 from right to left (as viewed in FIG. 4) at the same rate that the object being imaged actually moves through the device from right to left (due to driving contact by the rollers 366). This tends to give the appearance that a viewer of the display device 332 is viewing the actual object as it progresses through the digital picture frame device. This mimicking of the image acquisition process is advantageous in that it provides visual confirmation to a user of the progress of an image acquisition operation.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A device comprising:
   a frame
   a lid movably attached to said frame, said lid being movable between a closed position and an open position;
   a display mounted to said lid;
   a photosensor array movably mounted within said frame;
   wherein said display is visible when said lid is in said closed position;
   wherein, a menu of options is displayed on said display; and
   wherein one of said options is for uploading an image to the internet.

2. The device of claim 1 wherein said lid is hingedly attached to said frame.

3. The device of claim 1 wherein said device is a digital picture frame device.

4. The device of claim 1 wherein said photosensor array is a CIS photosensor array.

5. The device of claim 1 wherein said photosensor array is a CCD photosensor array.

6. The device of claim 1 and further wherein:
   an image is displayed on said display when said lid is in said closed position.

7. The device of claim 1 wherein one of said options is for uploading or downloading an image via wireless communication.

8. The device of claim 1 and further comprising:
   a removable memory card device.

9. A system comprising:
   a frame;
   a lid movably attached to said frame, said lid being movable between a closed position and an open position;
   a display mounted to said lid;
   a photosensor array movably mounted within said frame;
   an object to be scanned by said photosensor array;
   wherein at least a portion of said lid is directly adjacent at least a portion of said object when said lid is in said closed position;
   wherein a menu of options is displayed on said display; and
   wherein one of said options is for uploading an image to the internet.

10. The device of claim 9 wherein said photosensor array is a CIS photosensor array.

11. The device of claim 9 wherein said photosensor array is a CCD photosensor array.

12. The device of claim 9 wherein said photosensor array is a two-dimensional photosensor array.

13. The system of claim 9 and further wherein:
    an image is visibly displayed on said display when said lid is in said closed position.

14. The system of claim 9 wherein one of said options is for uploading or downloading an image via wireless communication.

15. The system of claim 9 and further comprising:
    a removable memory card device.

16. A method comprising;
    providing a device comprising a frame, a photosensor array movably mounted within said frame, a lid movably attached to said frame and a display mounted to said lid, wherein said lid is movable between a closed position and an open position;
    moving said lid to said closed position such that at least a portion of said lid is positioned directly adjacent at least a portion of an object; and
    scanning said object with said photosensor array while said lid is in said closed position and said at least a portion of said lid is positioned directly adjacent said at least a portion of said object by moving said photosensor array within said frame;
    wherein said scanning causes an image of said object to be generated;
    displaying at least a portion of said image of said object on said display; and
    uploading said image to the internet.

17. The method of claim 16 wherein said displaying at least a portion of said image occurs when said scanning is taking place.

18. The method of claim 16 and further wherein:
    said image is visible when said lid is in said closed position.

19. The method of claim 16 and further comprising:
    displaying a menu of options on said display.

20. The method of claim 16 and further comprising:
    uploading an image from said device or downloading an image to said device via wireless communication.

21. The method of claim 16 and further:
    wherein said device further comprises a removable memory card device;
    wherein said scanning causes an image of said object to be generated; and
    using said removable memory card device to store said image on a removable memory card.

22. The method of claim 16 and further:
    wherein said scanning causes an image of said object to be generated; and
    using said device to transmit said image to a remote location.

* * * * *

UNITED STATES PATENT AND TRADEMARK OFFICE
CERTIFICATE OF CORRECTION

PATENT NO. : 7,154,642 B2
APPLICATION NO. : 09/748345
DATED : December 26, 2006
INVENTOR(S) : Hans A. Lichtfuss Page 1 of 1

It is certified that error appears in the above-identified patent and that said Letters Patent is hereby corrected as shown below:

On the face page, in field (56), under "U.S. Patent Documents", in column 1, line 7, below "5,044,727   9/1991   Steinle......... 350/171" insert
-- 5,115,374*   5/1992   Hongoh..... 361/681 --.

On page 2, in field (56), under "Other Publications", in column 2, lines 2-3, delete "Australian Patent Office Search Report dated Aug. 18, 2003, 2 pages".

In column 6, line 26, after "perform" insert -- a --.

In column 6, line 43, after "with" insert -- other --.

In column 11, line 25, in Claim 1, delete "frame" and insert -- frame; --, therefor.

In column 11, line 43, in Claim 5, delete "army" and insert -- array --, therefor.

In column 12, line 19, in Claim 16, delete "comprising;" and insert -- comprising: --, therefor.

Signed and Sealed this

Fifteenth Day of December, 2009

David J. Kappos
*Director of the United States Patent and Trademark Office*